United States Patent
Hong et al.

(10) Patent No.: US 12,542,855 B2
(45) Date of Patent: *Feb. 3, 2026

(54) SPLIT-MODE CONFERENCE ACCESS

(71) Applicant: Zoom Communications, Inc., San Jose, CA (US)

(72) Inventors: Karen Kuei Ren Hong, Los Altos, CA (US); Haibing Xu, Milpitas, CA (US); Dan Yang, San Jose, CA (US); Xudong Zhang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,913

(22) Filed: Dec. 19, 2023

(65) Prior Publication Data

US 2024/0121344 A1 Apr. 11, 2024

Related U.S. Application Data

(63) Continuation of application No. 17/240,581, filed on Apr. 26, 2021, now Pat. No. 11,889,028.

(51) Int. Cl.
*H04M 7/00* (2006.01)
*H04L 12/18* (2006.01)
(Continued)

(52) U.S. Cl.
CPC ............ *H04M 7/006* (2013.01); *H04L 12/18* (2013.01); *H04M 3/567* (2013.01); *H04N 7/15* (2013.01)

(58) Field of Classification Search
CPC . H04L 12/18; H04L 65/1094; H04L 65/4046; H04L 65/4053; H04M 3/567; H04M 7/006; H04N 7/15
See application file for complete search history.

(56) References Cited

U.S. PATENT DOCUMENTS 6,571,094 B1 5/2003 Begeja et al.
6,614,781 B1 9/2003 Elliott et al.
(Continued)

FOREIGN PATENT DOCUMENTS

CN 107959761 B 6/2020
CN 115767834 A 3/2023
(Continued)

OTHER PUBLICATIONS

International Search Report and Written Opinion mailed on Aug. 23, 2022 in corresponding PCT Application No. PCT/US2022/024739.
(Continued)

*Primary Examiner* — Marcus Smith
*Assistant Examiner* — Kai Chang
(74) *Attorney, Agent, or Firm* — Young Basile Hanlon & MacFarlane, P.C.

(57) ABSTRACT

A system for one-touch split-mode conference access includes a server that transmits a first message associated with a conference with a client. A VOIP device displays a notification based on the first message. The VOIP device transmits a second message to transfer an audio component of the conference to the VOIP device. The audio component of the conference is continued on the VOIP device and the video component of the conference is retained on the client.

20 Claims, 8 Drawing Sheets

(51) Int. Cl.
*H04M 3/56* (2006.01)
*H04N 7/15* (2006.01)

(56) References Cited

U.S. PATENT DOCUMENTS

| | | |
|---|---|---|
| 8,456,507 B1 | 6/2013 | Mallappa et al. |
| 8,582,565 B1 | 11/2013 | Morsy et al. |
| 8,774,370 B2 | 7/2014 | Krivorot et al. |
| 8,934,382 B2 | 1/2015 | Rodman et al. |
| 9,119,136 B2 | 8/2015 | Venkatachalam et al. |
| 9,172,766 B2 | 10/2015 | Narasimhan et al. |
| 9,300,205 B2 | 3/2016 | Matsui |
| 9,680,687 B2 * | 6/2017 | Chappelle ............ G06F 3/0488 |
| 10,063,461 B2 | 8/2018 | Tarricone et al. |
| 10,291,597 B2 | 5/2019 | Li et al. |
| 10,348,902 B1 | 7/2019 | Liu |
| 10,467,426 B1 | 11/2019 | Esposito et al. |
| 10,516,705 B2 | 12/2019 | Barjonas et al. |
| 10,645,088 B1 | 5/2020 | Yanes et al. |
| 10,834,147 B1 | 11/2020 | Wehrung et al. |
| 11,233,870 B1 | 1/2022 | Gupta et al. |
| 11,916,979 B2 | 2/2024 | Hong et al. |
| 2003/0137959 A1 | 7/2003 | Nebiker et al. |
| 2003/0137991 A1 | 7/2003 | Doshi et al. |
| 2003/0152209 A1 | 8/2003 | Andreason |
| 2004/0001479 A1 | 1/2004 | Pounds et al. |
| 2004/0004942 A1 | 1/2004 | Nebiker et al. |
| 2005/0138183 A1 | 6/2005 | O'Rourke et al. |
| 2006/0013201 A1 | 1/2006 | Bettis et al. |
| 2007/0248221 A1 | 10/2007 | Chatterjee et al. |
| 2007/0250567 A1 | 10/2007 | Graham et al. |
| 2007/0283142 A1 | 12/2007 | Milstein et al. |
| 2008/0175230 A1 | 7/2008 | Brand et al. |
| 2008/0194244 A1 | 8/2008 | Chen et al. |
| 2008/0219223 A1 * | 9/2008 | Bienas ............... H04L 65/4053 370/338 |
| 2008/0219240 A1 | 9/2008 | Dylag et al. |
| 2008/0232362 A1 | 9/2008 | Miyajima et al. |
| 2011/0164744 A1 | 7/2011 | Olshansky et al. |
| 2011/0182281 A1 | 7/2011 | Siddique et al. |
| 2012/0257566 A1 | 10/2012 | Le et al. |
| 2013/0227149 A1 | 8/2013 | Athlur et al. |
| 2014/0029474 A1 | 1/2014 | Bhagavatula et al. |
| 2014/0089143 A1 | 3/2014 | Dione |
| 2014/0146129 A1 * | 5/2014 | Ye ...................... H04N 7/147 348/14.09 |
| 2014/0218517 A1 | 8/2014 | Kim et al. |
| 2014/0270130 A1 | 9/2014 | Casalaina et al. |
| 2014/0313998 A1 | 10/2014 | Sorescu |
| 2014/0324527 A1 | 10/2014 | Kulkarni et al. |
| 2015/0032809 A1 * | 1/2015 | Xie ....................... H04L 65/403 709/204 |
| 2015/0244979 A1 | 8/2015 | Andrada et al. |
| 2015/0358580 A1 | 12/2015 | Zhou et al. |
| 2016/0072955 A1 * | 3/2016 | Barkan ................. H04M 3/543 455/417 |
| 2016/0095141 A1 | 3/2016 | Ma et al. |
| 2016/0142591 A1 * | 5/2016 | Modai ..................... H04N 5/45 348/14.08 |
| 2016/0205348 A1 * | 7/2016 | Yang ................... H04L 65/1069 348/14.03 |
| 2016/0294786 A1 | 10/2016 | Marquez Mendoza et al. |
| 2016/0301743 A1 | 10/2016 | Zhang |
| 2016/0323863 A1 * | 11/2016 | Park ......................... H04W 4/70 |
| 2017/0064572 A1 * | 3/2017 | Subramanian ........ H04W 40/02 |
| 2017/0180484 A1 | 6/2017 | Asveren et al. |
| 2017/0187771 A1 * | 6/2017 | Falcon ................. H04L 65/1094 |
| 2017/0237986 A1 * | 8/2017 | Choi ....................... H04W 4/80 348/14.02 |
| 2018/0077260 A1 | 3/2018 | Faltyn et al. |
| 2019/0082477 A1 | 3/2019 | Burton et al. |
| 2019/0102049 A1 | 4/2019 | Anzures et al. |
| 2019/0141096 A1 | 5/2019 | Rist et al. |
| 2019/0245895 A1 | 8/2019 | Balasaygun et al. |
| 2020/0204538 A1 | 6/2020 | Friel |
| 2020/0220977 A1 * | 7/2020 | Ravichandran ..... H04L 65/1093 |
| 2020/0252765 A1 | 8/2020 | Baker et al. |
| 2020/0327240 A1 | 10/2020 | Zou et al. |
| 2021/0218836 A1 * | 7/2021 | Alameh ................. H04W 4/80 |
| 2021/0377345 A1 | 12/2021 | Li et al. |

FOREIGN PATENT DOCUMENTS

| | | |
|---|---|---|
| EP | 1551164 A2 | 7/2005 |
| EP | 1968334 A2 | 9/2008 |
| EP | 2503768 A1 | 9/2012 |
| EP | 3249940 | 11/2017 |
| WO | 2022231852 A1 | 11/2022 |

OTHER PUBLICATIONS

How Does a Bluetooth Headset Work? From Jabra GN Website: https://www.jabra.com/fq/how-does-bluetooth-headset-work#:-:text=A%20Bluetooth%C2%AE%20device%20works,smartphones%2C%20laptops%20portable%20speakers. (Year: 2023).

International Search Report and Written Opinion mailed on Jul. 4, 2023 in corresponding PCT Application No. PCT/US2023/0190176.

European Office Action mailed Mar. 28, 2025 in corresponding European Application No. 22722921.8.

* cited by examiner

SPLIT-MODE CONFERENCE ACCESS

CROSS-REFERENCE TO RELATED APPLICATION(S)

This application is a continuation of U.S. patent application Ser. No. 17/240,581 filed Apr. 26, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for one-touch split-mode conference access.

One aspect of this disclosure is a system that includes a client, a server, a voice over internet protocol (VOIP) device, and a telephony server. The client may be configured to join a conference. The client may be configured to obtain information associated with the conference. The conference may include an audio component, a video component, or both. The server may be configured to receive the information associated with the conference. The server may be configured to transmit a first message. The first message may include the information associated with the conference. The VOIP device may be paired with the client based on a user account. The VOIP device may be configured to display a notification on a display of the VOIP device in response to the first message. The VOIP device may be configured to receive an input from a user. The VOIP device may be configured to transmit a second message to the server. The second message may include call information. The call information may be based on the input. The telephony server may be configured to receive a join message from the server to join the conference. The telephony server may be configured to initiate the audio component of the conference on the VOIP device.

Another aspect of this disclosure is a VOIP device for one-touch split-mode conference access. The VOIP device may include a display, a transmitter, and a processor. The display may be configured to display a notification. The notification may indicate one or more options to join a conference. The transmitter may be configured to transmit a message to a private branch exchange (PBX) server. The message may include an action selection. The action selection may be based on the one or more options to join the conference. The processor may be configured to join an audio component of the conference based on the action selection.

Another aspect of this disclosure is a method for one-touch split-mode conference access. The method includes transmitting a first message. The first message may include information associated with a conference. The first message may be received from a client. The method includes displaying a notification on a display of a VOIP device to obtain an input. The method includes transmitting a second message in response to the obtained input. The second message may be transmitted to join an audio component of a conference on the VOIP device and a video component of the conference on the client. The method includes initiating the audio component of the conference on the VOIP device based on the second message.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Many computer device users attend conferences implemented by a software platform, such as a UCaaS platform. The conferences typically include an audio component and a video component. Due to privacy concerns or the limitations of audio components on the computing devices, many users would prefer for the audio component of a conference to be implemented using another device with improved audio quality and/or which allows for increased privacy. Many computer device users also have access to a VOIP device and enjoy the audio quality of their VOIP device; however, typical VOIP devices do not include display components configured for video output and thus cannot handle the video component of the conference.

Implementations of this disclosure address problems such as these by providing users with split-mode conference access to join an audio component of a conference on a VOIP device and join a video component of the conference on a different device, such as a computing device. The split-mode conference access may be implemented as a soft key or a hard key on the VOIP device to allow one-touch access.

Figure 1:
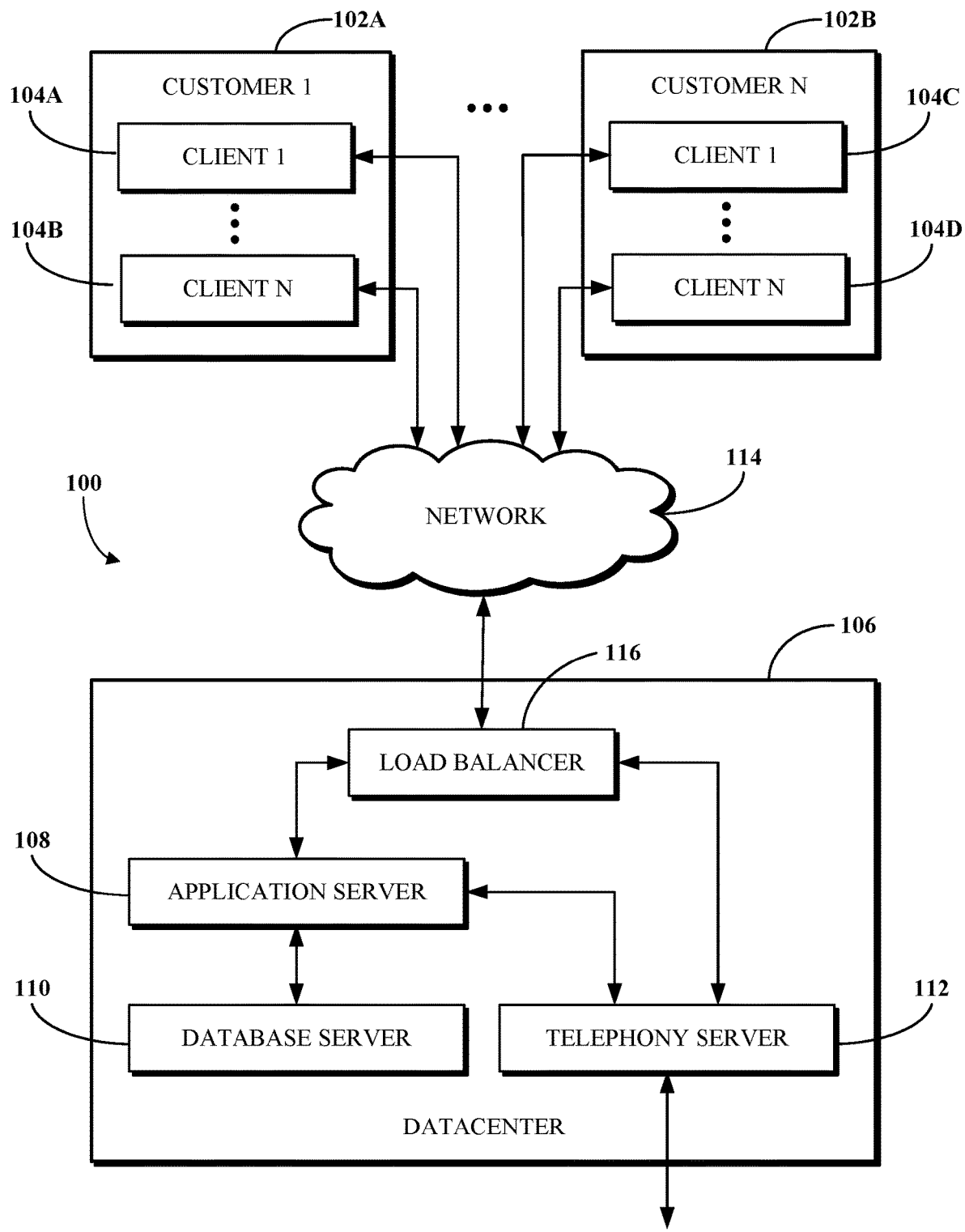
FIG. 1 is a block diagram of an example of an electronic computing and communications system.

To describe some implementations in greater detail, reference is first made to examples of hardware and software structures used to implement a system for providing one-touch split-mode conference access on a VOIP device. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106.

Figure 2:
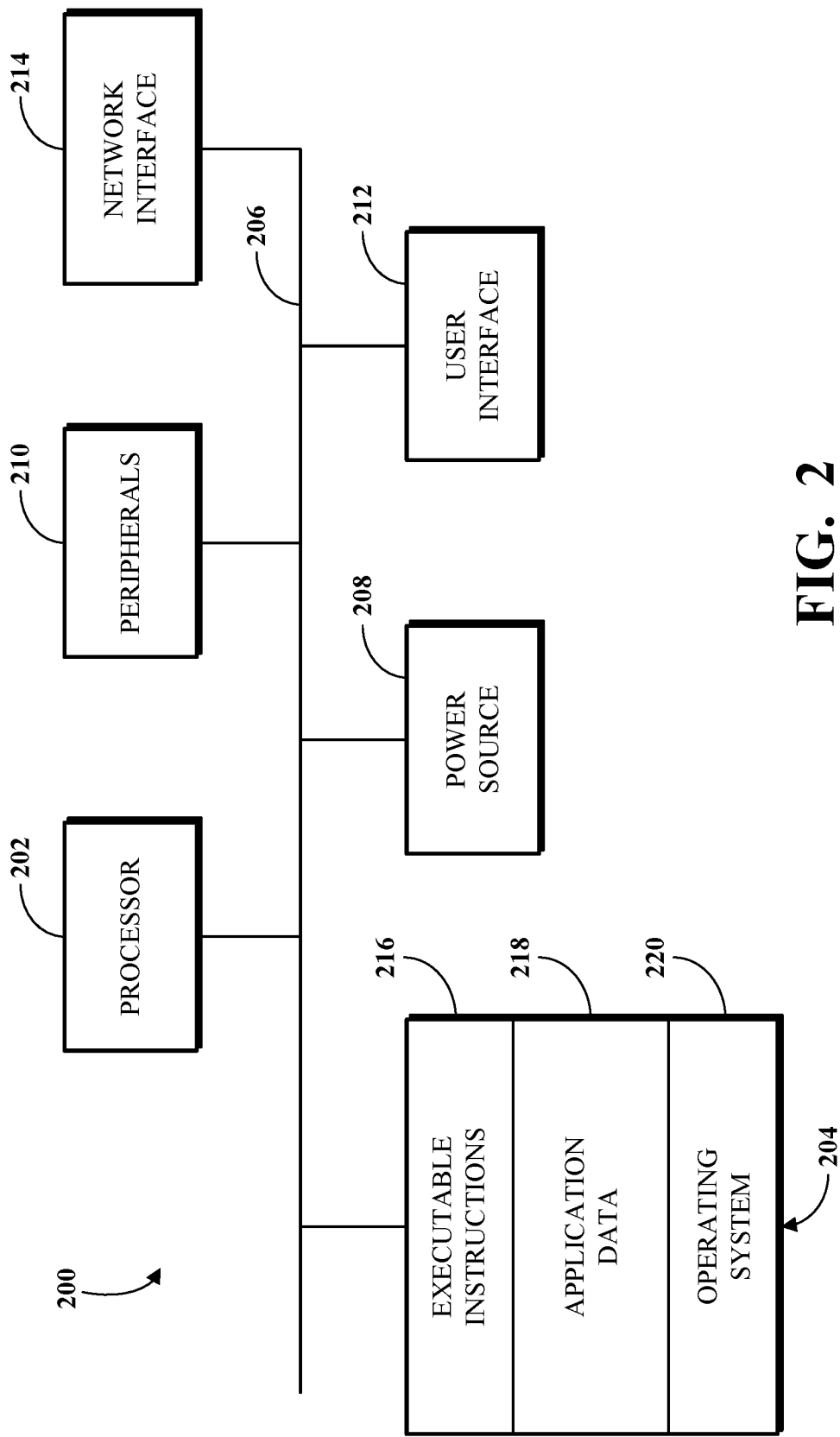
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
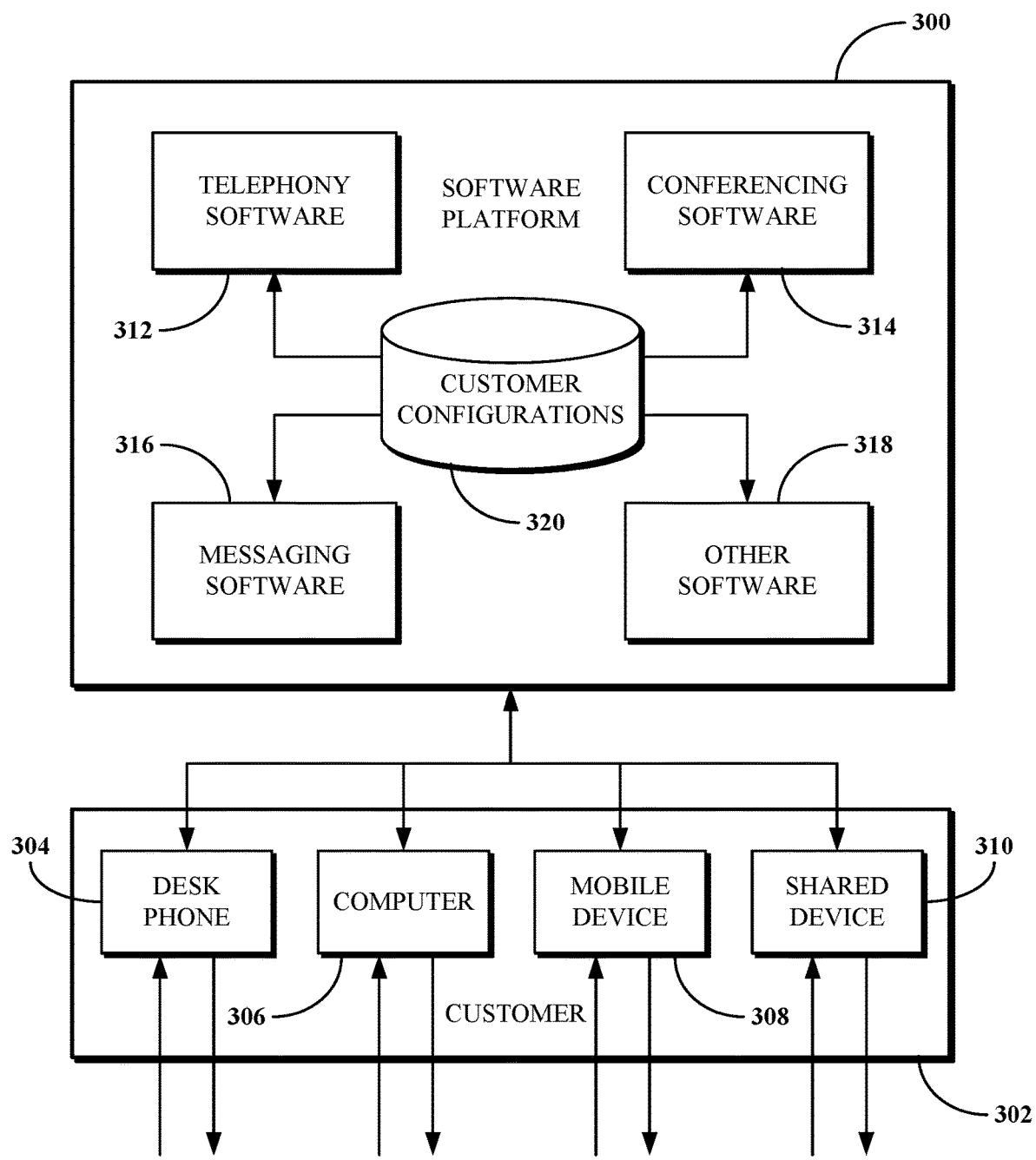
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. For example, the telephony software 312 may be implemented using one or more both of an application server and a telephony server, such as the application server 108 and the telephony server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include split-mode conference access software.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtualized meeting. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
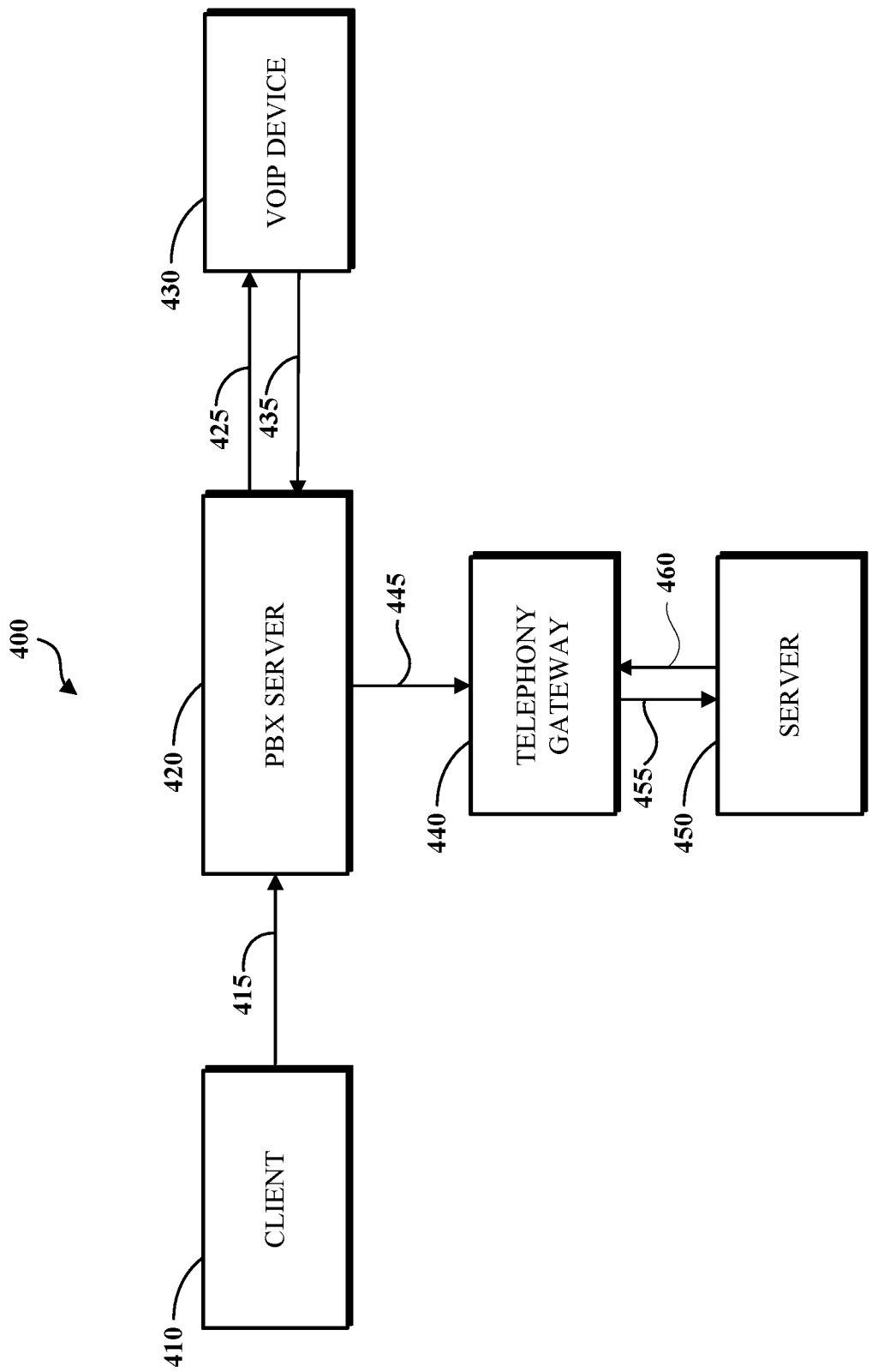
FIG. 4 is a diagram of an example of a system for providing one-touch split-mode conference access on a VOIP device.

FIG. 4 is a diagram of an example of a system 400 for providing one-touch split-mode conference access on a client or device. The client or device may be a VOIP-enabled client or device or a non-VOIP-enabled client or device. For simplicity, the examples discussed herein refer to a VOIP device, and it is understood that some implementations can include VOIP-enabled clients or devices or non-VOIP-enabled clients or devices. The system 400 includes a client 410, a PBX server 420, a VOIP device 430, a telephony gateway 440, and a server 450. The telephony gateway 440 may operate as an intermediary between the SBC of the telephony server 112 shown in FIG. 1 and a PSTN for a peered carrier. The server 450 may, for example, be the application server 108 shown in FIG. 1.

The client 410 may be a hardware device including a display such as a mobile phone, a tablet computer, a laptop computer, a notebook computer, a desktop computer, or another suitable computing device or combination of computing devices. The client 410 may be configured to run one or more software applications, such as the telephony software 312, conferencing software 314, messaging software 316, and/or other software 318 shown in FIG. 3. The client 410 may include an audio input device, an audio output device, or both. In one example, the audio input device may be a microphone, and the audio output device may be a speaker. The client 410 is configured to start a conference, join a conference, elevate a conference, receive a conference invite, stop a conference, or any combination thereof. The conference is a communication session between multiple participants and includes at least an audio component and a video component. The conference is a session that may also in some cases include an instant messaging or chat component, a content sharing component, or any combination thereof. Examples of elevating a conference include, and are not limited to, elevating an audio component to a video component or elevating a chat component to an audio component or a video component. The client 410 is configured to transmit a message 415 to the PBX server 420 to join or elevate a conference. The PBX server 420 is configured to route an audio portion of the conference from the client 410 to the VOIP device 430 using SIP messaging. The message 415 may be a notify message and may include conference information. For example, the conference information may include a conference identification (ID) such as a conference number, an attendee ID, user account information, a security credential such as a password, a client ID or address, or any combination thereof. The message 415 may be used to interact with the PBX server 420, for example, in response to receiving a conference status change, the client 410 may transmit the message 415 to notify the PBX server 420 of the conference status. Example conference statuses include an early status that indicates a ring, a confirmed status that indicates a conference in progress, and a terminate status that indicates a conference end. The message 415 may be used by the client 410 to notify the PBX server 420 to transmit a push notification to the VOIP device 430. The push notification may be based on an Extensible Messaging and Presence Protocol (XMPP) such that the client 410 may receive a message from an XMPP server.

The PBX server 420 receives the message 415 and transmits a message 425 to the VOIP device 430. The message 425 may be a busy lamp field (BLF) message. The message 425 may be transmitted using SIP messaging protocols. The message 425 may include an indication of the conference status. The message 425 may cause a light on the VOIP device 430 to illuminate. The light on the VOIP device 430 may be a soft key on the user interface of the VOIP device 430 or a hard key on the VOIP device 430. Illumination of the soft key or the hard key may be based on the conference status. For example, the VOIP device 430 may have different hard keys and/or different hard keys for each conference status, and the appropriate hard key or soft key will illuminate based on the indicated conference status.

The VOIP device 430 is paired with the client 410 based on a user account such that the VOIP device 430 is not tethered to the client 410 using a wired connection such as a universal serial bus (USB) or ethernet connection. The VOIP device 430 receives the message 425 from the PBX server 420 and displays a notification on a display of the VOIP device 430 in response to the message 425. In some examples, the notification may be an illuminated light on a hard key of the VOIP device 430. The notification may indicate one or more configurations or options with respect to how the user may connect to the audio component of the conference. One option may include an audio option to allow a user to join the audio component of the conference on the VOIP device 430 and the video component of the conference on the client 410. Another option may include an audio option to allow the user to only join the audio component of the conference using the VOIP device 430. Another option may include a video option to allow the user to join the audio and video components of the conference on the client 410. Another option may include an ignore option to allow the user to ignore the conference and not join at all.

The VOIP device 430 is configured to receive an input from the user. The input is based on one or more of the options indicated in the notification. In response to receiving the input, the VOIP device 430 is configured to transmit a message 435 to the PBX server 420 to indicate a selected audio component option for the conference. The message 435 may be a SIP invite message. The message 435 includes call information. The call information may be based on the input. For example, if the input indicates that the user selected the option to join the audio component of the conference on the VOIP device 430 and the video component on the client 410, the call information will include information that indicates that the audio component of the conference is to be routed to the VOIP device 430, the video component of the conference is to be routed to the client 410, or both. The call information may include a VOIP device ID or address, user account information, or both.

In this example, the PBX server 420 is configured to receive the message 435 and transmit a message 445 to the telephony gateway 440. The telephony gateway 440 is configured to connect the PBX server 420 to the PSTN. In this example, the message 445 indicates that the audio component of the conference is to be routed to the VOIP device 430. The message 445 may also include the client ID or address, VOIP device ID or address, user account information, or any combination thereof. The telephony gateway 440 is configured to transmit a message 455 to the server 450. The message 455 indicates that the audio component of the conference is to be routed to the VOIP device 430. The message 455 may also include the client ID or address, VOIP device ID or address, user account information, or any combination thereof.

The server 450 is configured to receive the message 455 and connect the user to the conference based on the message. In this example, the user indicated to join the audio component of the conference on the VOIP device 430 and the video component of the conference on the client 410. The server 450 may transmit messages 460 via the telephony gateway 440. Each message 460 may be associated with an audio component of the conference, a video component of the conference, or both. The messages 460 may include a destination in a header portion for each message 460. For example, the header portion of a message 460 may include a client ID or address to indicate that the client 410 is the destination for the audio and/or video component of the conference, or a VOIP device ID or address to indicate that the VOIP device 430 is the destination for the audio and/or video component of the conference. In this example, the audio component of the conference on the VOIP device 430 is bridged with the server 450 while the PBX server 420 is configured to transmit a push notification to the client 410 which is used to notify the client 410 of the user's selection for the incoming conference event. In this example, the audio source for the conference is the VOIP device 430 and the video source for the conference is the client 410.

Figure 5:
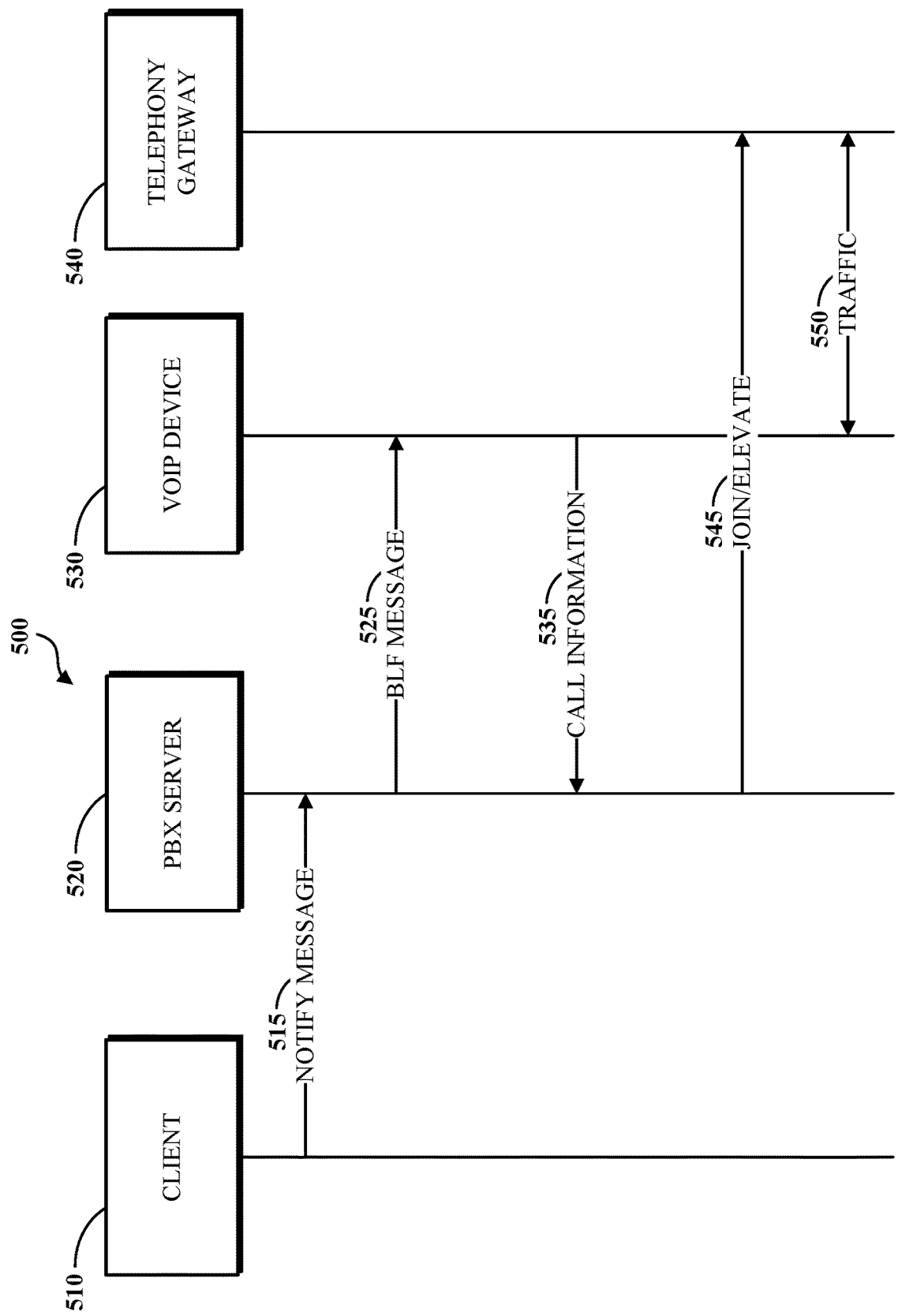
FIG. 5 is a signal diagram of an example of a system for providing one-touch split-mode conference access on a VOIP device for an ad-hoc conference.

FIG. 5 is a signal diagram of an example of a system 500 for providing one-touch split-mode conference access on a VOIP device for an ad-hoc conference. The system 500 includes a client 510, a PBX server 520, a VOIP device 530, and a telephony gateway 540, which may, for example, respectively be the client 410, the PBX server 420, the VOIP device 430, and the telephone gateway 440 shown in FIG. 4. In this example, a user may be in a conference on the client 510 and wish to switch the audio component of the conference to the VOIP device 530 while retaining the video component of the conference on the client 510.

The client 510 is configured to transmit a message 515 to the PBX server 520. The message 515 may be triggered by a user input at the client 515. The message 515 may be a notify message may include conference information, for example in an information field. The conference information may include a conference ID such as a conference number, an attendee ID, user account information, a security credential such as a password, a client ID or address, or any combination thereof.

In an example where there is an ongoing conference, the message 515 may be triggered by the user at the VOIP device 530 by picking up the receiver or pressing a button. In this example, the message 515 may be an invite message that is transmitted from the VOIP device 530 to the PBX server 520.

The PBX server 520 receives the message 515 and transmits a message 525 to the VOIP device 530. The message 525 may be a BLF message. The message 525 may include conference information, for example in an information field. The conference information may include a conference ID such as a conference number, an attendee ID, user account information, a security credential such as a password, a client ID or address, or any combination thereof. The message 525 may be transmitted using SIP messaging protocols. The message 525 may cause a light on the VOIP device 530 to illuminate. The light on the VOIP device 530 may be a soft key on the user interface of the VOIP device 530 or a hard key on the VOIP device 530.

The VOIP device 530 is paired with the client 510 based on a user account such that the VOIP device 530 is not tethered to the client 510 using a wired connection such as a USB or ethernet connection. The VOIP device 530 may be wirelessly paired with the client 510 when the user logs into their user account on both the VOIP device 530 and the client 510. The VOIP device 530 receives the message 525 from the PBX server 520 and displays a notification on a display of the VOIP device 530 in response to the message 525. In some examples, the notification may be an illuminated light on a hard key of the VOIP device 530. The notification may indicate one or more options for the user to join the conference. One option may include an audio option to allow a user to join the audio component of the conference on the VOIP device 530 and the video component of the conference on the client 510. Another option may include an audio option to allow the user to only join the audio component of the conference using the VOIP device 530. Another option may include a video option to allow the user to join the audio and video components of the conference on the client 510. Another option may include an ignore option to allow the user to ignore the conference and not join at all.

The VOIP device 530 is configured to receive an input from the user. The input is based on one or more of the options indicated in the notification. In response to receiving the input, the VOIP device 530 is configured to transmit a message 535 to the PBX server 520. The message 535 includes call information. The call information may include an action, a conference ID, an attendee ID, user account information, a security credential such as a password, a VOIP device ID or address, or any combination thereof. The action may be based on the input. For example, if the input indicates that the user selected the option to join the audio component of the conference on the VOIP device 530 and the video component on the client 510, the action will include information that indicates that the audio component of the conference is to be routed to the VOIP device 530, the video component of the conference is to be routed to the client 510, or both.

In response to receiving the message 535, the PBX server 520 is configured to transmit a message 545 to the telephony gateway 540. In this example, the message 545 indicates that the audio component of the conference is to be routed to the VOIP device 530. The message 545 may also include the client ID or address, VOIP device ID or address, attendee ID, user account information, or any combination thereof. In an example, the message 545 may indicate to the telephony gateway 540 to join or elevate the audio component of the conference using the attendee ID. The telephony gateway 540 is configured to receive the message 545 and direct the traffic 550 associated with the audio component of the conference to the VOIP device 530 while the video component of the conference remains on the client 510. The telephony gateway 540 is configured to direct the traffic 550 associated with the audio component of the conference to the VOIP device 530 via the PBX server 520.

Figure 6:
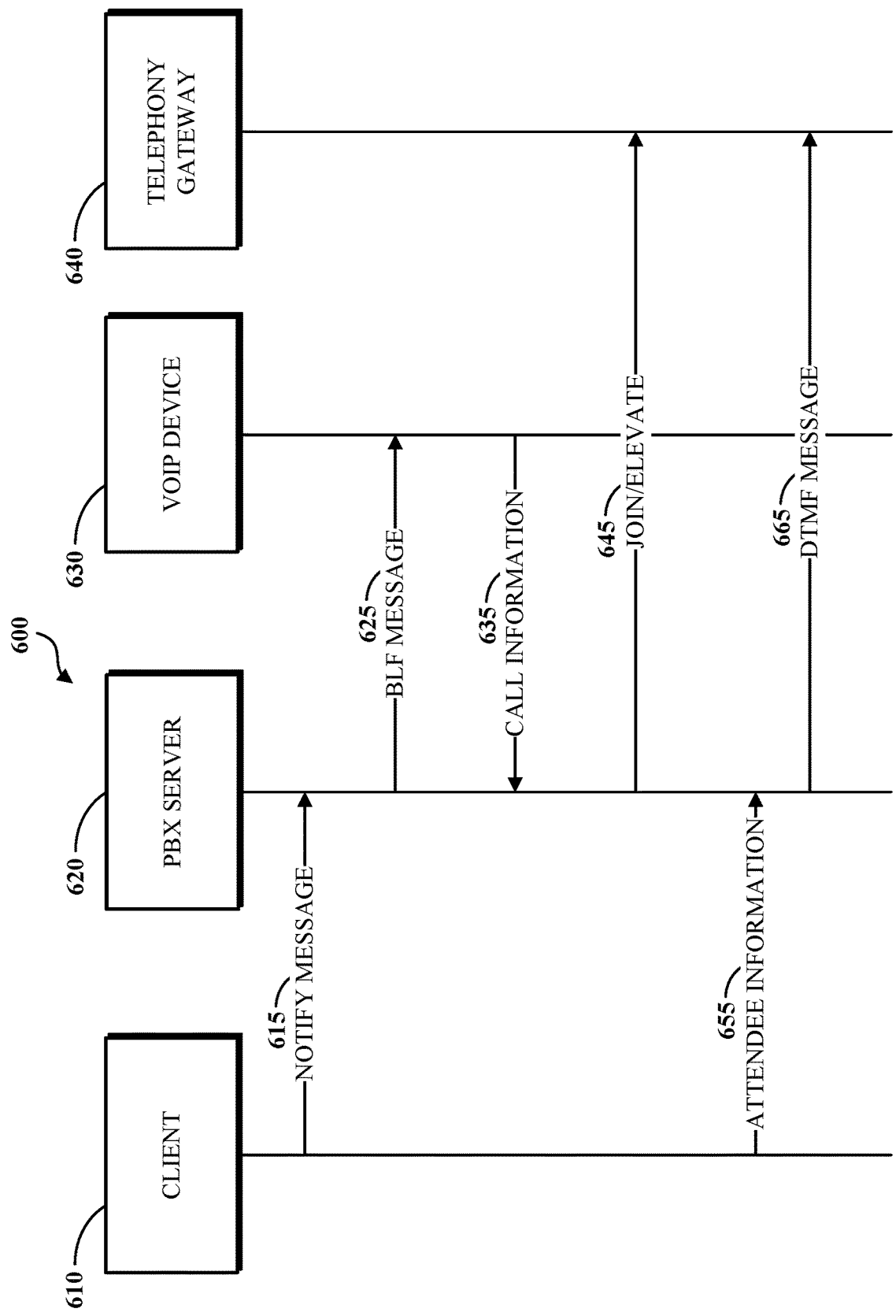
FIG. 6 is a signal diagram of an example of a system for providing one-touch split-mode conference access on a VOIP device for a scheduled conference.

FIG. 6 is a signal diagram of an example of a system 600 for providing one-touch split-mode conference access on a VOIP device for a scheduled conference. The system 600 includes a client 610, a PBX server 620, a VOIP device 630, and a telephony gateway 640, which may, for example, respectively be the client 410, the PBX server 420, the VOIP device 430, and the telephone gateway 440 shown in FIG. 4. In this example, a user may receive an invite to join a conference on the client 610 and wish to join the audio component of the conference to the VOIP device 630 and join the video component of the conference on the client 610. In this example, the incoming invite may cause both client 610 and VOIP device 630 ringing, The client 610 is configured to transmit a message 615 to the PBX server 620. The message 615 may be triggered by a user input at the client 615. The message 615 may be a notify message may include conference information, for example in an information field. The conference information may include a conference ID such as a conference number, an attendee ID, user account information, a security credential such as a password, a client ID or address, or any combination thereof.

The PBX server 620 receives the message 615 and transmits a message 625 to the VOIP device 630. The message 625 may be a BLF message. The message 625 may include conference information, for example in an information field. The conference information may include a conference ID such as a conference number, an attendee ID, user account information, a security credential such as a password, a client ID or address, or any combination thereof. The message 625 may be transmitted using SIP messaging protocols. The message 625 may cause a light on the VOIP device 630 to illuminate. The light on the VOIP device 630 may be a soft key on the user interface of the VOIP device 630 or a hard key on the VOIP device 630.

The VOIP device 630 is paired with the client 610 based on a user account such that the VOIP device 630 is not tethered to the client 610 using a wired connection such as a USB or ethernet connection. The VOIP device 630 may be wirelessly paired with the client 610 when the user logs into their user account on both the VOIP device 630 and the client 610. The VOIP device 630 receives the message 625 from the PBX server 620 and displays a notification on a display of the VOIP device 630 in response to the message 625. In some examples, the notification may be an illuminated light on a hard key of the VOIP device 630. The notification may indicate one or more options for the user to join the conference. One option may include an audio option to allow a user to join the audio component of the conference on the VOIP device 630 and the video component of the conference on the client 610. Another option may include an audio option to allow the user to only join the audio component of the conference using the VOIP device 630. Another option may include a video option to allow the user to join the audio and video components of the conference on the client 610. Another option may include an ignore option to allow the user to ignore the conference and not join at all.

The VOIP device 630 is configured to receive an input from the user. The input is based on one or more of the options indicated in the notification. In response to receiving the input, the VOIP device 630 is configured to transmit a message 635 to the PBX server 620. The message 635 may be an invite message. The message 635 includes call information. The call information may include an action, a conference ID, an attendee ID, user account information, a security credential such as a password, a VOIP device ID or address, or any combination thereof. The action may be based on the input. For example, if the input indicates that the user selected the option to join the audio component of the conference on the VOIP device 630 and the video component on the client 610, the action will include information that indicates that the audio component of the conference is to be routed to the VOIP device 630, the video component of the conference is to be routed to the client 610, or both.

In response to receiving the message 635, the PBX server 620 is configured to transmit a message 645 to the telephony gateway 640. In this example, the message 645 indicates that the audio component of the conference is to be routed to the VOIP device 630. The message 645 may also include the client ID or address, VOIP device ID or address, attendee ID, user account information, or any combination thereof. In an example, the message 645 may indicate to the telephony gateway 640 to join or elevate the audio component of the conference using the attendee ID. The message 645 may be used to bind the audio device (i.e., the VOIP device 630) to a conference video client.

The telephony gateway 640 is configured to receive the message 645 and join or elevate the conference by connecting the audio component of the conference to the VOIP device 630 while the video component of the conference remains on the client 610. The client 610 is configured to confirm that the VOIP device 630 successfully joined the conference. In response to confirming that the VOIP device 630 has successfully joined the conference, the client 610 is configured to transmit a message 655 to the PBX server 520. The message 655 may include the attendee ID.

The PBX server 620 is configured to receive the message 655 and check the channel universally unique identifier (UUID) associated with the conference. The UUID indicates the bridged session so that once the PBX server 620 receives the message 655, the PBX server 620 determines a relevant session UUID to transmit a message 665. The PBX server 610 is configured to transmit the message 665 to the telephony gateway 640. The message 665 may be transmitted using dual-tone multi-frequency (DTMF) signaling. The message 665 may include the attendee ID, a conference ID such as a conference number and/or a conference state, or any combination thereof. The conference ID may be used to obtain relevant data saved in a server cache. The message 665 may be used to perform a binding operation, for example to bind the VOIP device 630 to the conference video client.

Figure 7:
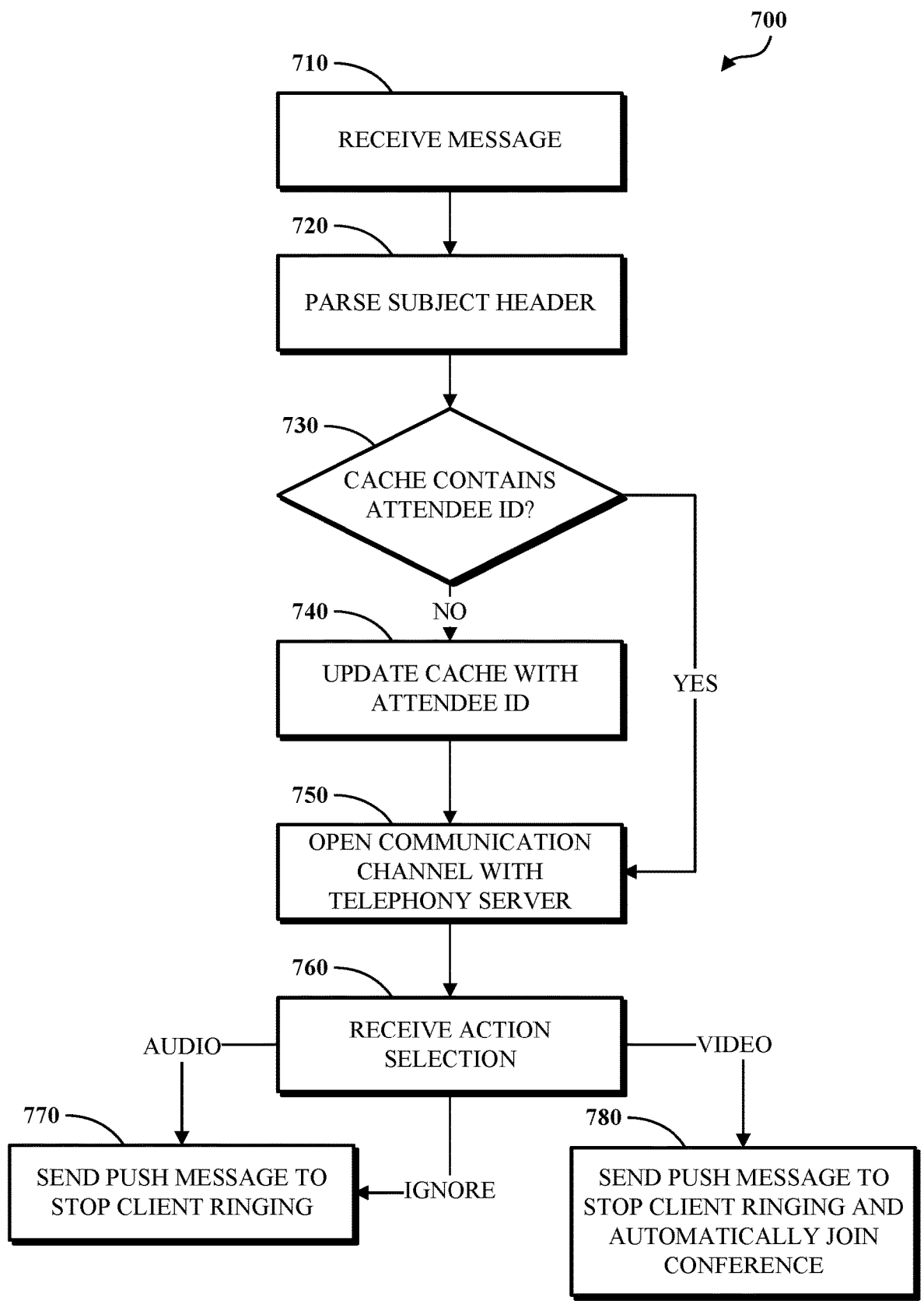
FIG. 7 is a flow diagram of an example of a method for one-touch split-mode conference access.
Figure 8:
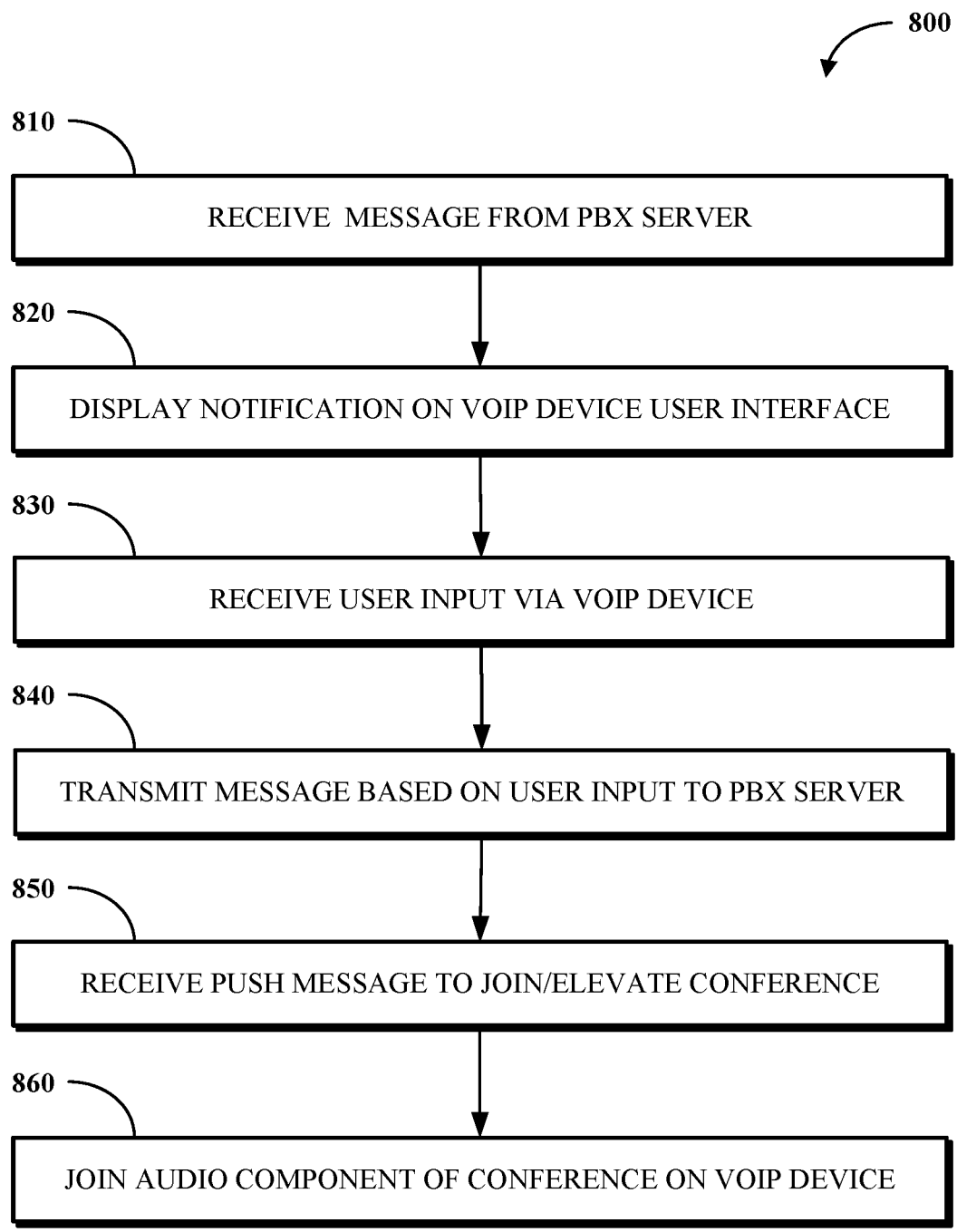
FIG. 8 is a flowchart of an example of a method for one-touch split-mode conference access.

To further describe some implementations in greater detail, reference is next made to examples of methods that may be performed by or using a system and device for one-touch split-mode conference access. FIGS. 7-8 are a flowcharts of example methods 700, 800 for one-touch split-mode conference access. The methods 700, 800 can be executed using computing devices, such as the systems, hardware, and software described with respect to FIGS. 1-6. The methods 700, 800 can be performed, for example, by executing a machine-readable program or other computer-executable instructions, such as routines, instructions, programs, or other code. The steps, or operations, of the methods 700, 800 or another technique, method, process, or algorithm described in connection with the implementations disclosed herein can be implemented directly in hardware, firmware, software executed by hardware, circuitry, or a combination thereof.

For simplicity of explanation, the methods 700, 800 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 is a flow diagram of an example of a method 700 for one-touch split-mode conference access. The method 700 may be performed by a server, such as PBX server 520, 620 shown in FIGS. 5 and 6, respectively. The method 700 includes receiving 710 a message. The message may be received from a client, such as client 510, 610 shown in FIGS. 5 and 6, respectively. The message may be received via a SIP messaging protocol.

The method 700 includes parsing 720 the subject header of the message. In an example, the subject header of the message may be a SIP subject header. The subject header of the message may be parsed to determine an attendee ID. The method 700 includes determining 730 whether a cache of the server includes an attendee ID contained in the subject header of the message. If the cache of the server does not include the attendee ID contained in the subject header of the message, the method 700 includes updating 740 the cache to include the attendee ID. If the cache of the server includes the attendee ID, the method includes opening 750 a communication channel with a telephony server, such as telephony gateway 440, 640 shown in FIGS. 5 and 6, respectively.

The method 700 includes receiving 760 an action selection. The action selection may be received from a VOIP device, such as VOIP device 530, 630 shown in FIGS. 5 and 6, respectively. The action selection may indicate an audio selection, a video selection, or an ignore selection. The action selection may be based on a user input at the VOIP device. An audio selection may indicate that a user wishes to join an audio component of a conference using the VOIP device and join the video component of the conference using the client. In some examples, the audio selection may indicate that the user wishes to only join the audio component of the conference using the VOIP device. A video selection may indicate that the user wishes to join the audio component of the conference and the video component of the conference using the client. An ignore selection may indicate that the user does not wish to join the conference at all.

In an example where the user is on a conference on the client and wants to switch the audio portion of the conference to the VOIP device, VOIP device may transmit an invite message to the PBX server based on a user input. The invite message may include conference information, so that the PBX server can be bridged with the telephony gateway, and the conference server will help to bind the VOIP device into the conference client based on the attendee ID, for example. After successfully binding the VOIP device, the client may automatically close the local audio portion of the conference.

If an audio selection or an ignore selection is received, the method 700 includes sending 770 a push message to the client. The push message may indicate to stop ringing at the client. If an ignore selection is received or the audio selection indicates that the user wishes to join only the audio component of the conference on the VOIP device, the push message may also indicate to close the user interface at the client. If a video selection is received, the method 700 includes sending 780 a push message to the client. The push message may indicate to stop ringing at the client and automatically join the audio and video components of the conference on the client.

FIG. 8 is a flowchart of an example of a method 800 for one-touch split-mode conference access. The method 800 includes receiving 810 a message. The message may be a BLF message. The message may include conference information, for example in an information field. The conference information may include a conference ID such as a conference number, an attendee ID, user account information, a security credential such as a password, a client ID or address, or any combination thereof. The message may be received using SIP messaging protocols.

The method 800 includes displaying 820 a notification, for example, on a user interface of a VOIP device such as VOIP device 530, 630 shown in FIGS. 5 and 6, respectively. The message may cause a light on the VOIP device to illuminate. The light on the VOIP device may be a soft key on the user interface of the VOIP device or a hard key on the VOIP device. The notification may indicate one or more options for the user to join the conference. One option may include an audio option to allow a user to join the audio component of the conference on the VOIP device and the video component of the conference on a client, such as client 510, 610 shown in FIGS. 5 and 6, respectively. Another option may include an audio option to allow the user to only join the audio component of the conference using the VOIP device. Another option may include a video option to allow the user to join the audio and video components of the conference on the client. Another option may include an ignore option to allow the user to ignore the conference and not join at all.

The method 800 includes receiving 830 an input, for example a user input obtained via the user interface of the VOIP device. The input is based on one or more of the options indicated in the notification. The input may a touch input, a gesture input, or a voice input. For example, a touch input may include a press of a hard key on the VOIP device or a press of a soft key on a display of the VOIP device. A gesture input may include a gesture, such as picking up the receiver of the VOIP device or a swipe on a display of the VOIP device. A voice input may include a spoken command that is detected by a component of the VOIP device, such as a microphone.

In response to receiving the input, the method 800 includes transmitting 840 a message to a PBX server, such as PBX server 520, 620 shown in FIGS. 5 and 6, respectively. The message transmitted to the PBX server includes call information. The call information may include an action, a conference ID, an attendee ID, user account information, a security credential such as a password, a VOIP device ID or address, or any combination thereof. The action may be based on the input. For example, if the input indicates that the user selected the option to join the audio component of the conference on the VOIP device and the video component on the client, the action will include information that indicates that the audio component of the conference is to be routed to the VOIP device, the video component of the conference is to be routed to the client, or both.

The method 800 includes receiving 850 a push message. The push message may include an indication to stop ringing at the VOIP device, an indication to join the audio component of the conference on the VOIP device, or both. If the push message includes an indication to join the audio component of the conference on the VOIP device, the technique 800 includes joining 860 the audio component of the conference on the VOIP device.

An aspect includes a method that includes transmitting a first message corresponding to a conference with a client. The method may include displaying a notification on a display of a VOIP device responsive to the first message. The notification may include one or more configurations associated with an audio component and a video component of the conference. The method may include transmitting a second message to transfer the audio component to the VOIP device. The method may include continuing the audio component on the VOIP device and retaining the video component on the client.

An aspect includes a system that comprises a server and a VOIP device. The server may be configured to transmit a first message corresponding to a conference with a client. The VOIP device may be configured to display a notification on a display of the VOIP device responsive to the first message. The notification may include one or more configurations associated with an audio component and a video component of the conference. The VOIP device may be configured to transmit a second message to transfer the audio component to the VOIP device. The VOIP device may be configured to continue the audio component on the VOIP device and retain the video component on the client.

An aspect includes a non-transitory computer-readable medium comprising instructions, that when executed by one or more processors, causes the one or more processors to perform operations. The operations may include transmitting a first message corresponding to a conference with a client. The operations may include displaying a notification on a display of a VOIP device responsive to the first message. The notification may include one or more configurations associated with an audio component and a video component of the conference. The operations may include transmitting a second message to transfer the audio component to the VOIP device. The operations may include continuing the audio component on the VOIP device and retaining the video component on the client.

In one or more aspects, the second message may include an attendee ID. In one or more aspects, an input may be obtained from the client. In one or more aspects, the input may be based on a touch input, a gesture input, or a voice input. In one or more aspects, the first message may include information associated with the conference. In one or more aspects, the information associated with the conference may include at least one of a conference number, a security credential, or an attendee ID. In one or more aspects, the first message may be transmitted using a SIP messaging protocol. In one or more aspects, the second message may include call information. In one or more aspects, the call information may include at least one of an action to join the conference, a conference number, a security credential, or an attendee ID. In one or more aspects, the server may be a PBX server. In one or more aspects, the first message may be a BLF notify message. In one or more aspects, the notification may be displayed as one or more soft keys on a user interface of the VOIP device. In one or more aspects, the notification may be displayed as a light associated with a hard key on the VOIP device. In one or more aspects, the VOIP device may be paired with the client. In one or more aspects, the VOIP device may be paired with the client based on a user account. In one or more aspects, the second message may include an action selection based on one or more options to join the conference. In one or more aspects, the one or more options to join the conference may include at least one of an audio option, a video option, or an ignore option. In one or more aspects, the audio option may allow a user to join the audio component of the conference on the VOIP device and the video component of the conference on a different device. In one or more aspects, the video option may allow a user to join the audio component and the video component of the conference on a different device. In one or more aspects, the ignore option may allow a user to ignore the conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    connecting to a conference;
    transmitting a first message corresponding to the conference with a client device;
    displaying a notification on a display of a voice over internet protocol (VOIP) device responsive to the first message, the notification including one or more configurations associated with an audio component and a video component of the conference, wherein the VOIP device and the client device are wirelessly paired based on a user account;
    transmitting a second message to transfer the audio component of the conference to the VOIP device; and
    continuing the audio component of the conference on the VOIP device and continuing the video component of the conference on the client device.

2. The method of claim 1, wherein the second message includes an attendee identification (ID).

3. The method of claim 1, further comprising:
    obtaining an input from the client device, wherein the input is based on at least one of a touch input, a gesture input, or a voice input.

4. The method of claim 1, wherein the first message includes information associated with the conference.

5. The method of claim 4, wherein the information associated with the conference includes at least one of a conference number, a security credential, or an attendee identification (ID).

6. The method of claim 1, wherein the first message is transmitted using a session initiation protocol (SIP) messaging protocol.

7. The method of claim 1, wherein the second message includes call information.

8. The method of claim 7, wherein the call information includes at least one of an action to join the conference, a conference number, a security credential, or an attendee identification (ID).

9. A system, comprising:
    a server configured to connect to a conference and transmit a first message corresponding to the conference with a client device;
    a voice over internet protocol (VOIP) device configured to:
        display a notification on a display of the VOIP device responsive to the first message, the notification including one or more configurations associated with an audio component and a video component of the conference, wherein the VOIP device and the client device are wirelessly paired based on a user account;

transmit a second message to transfer the audio component of the conference to the VOIP device; and
continue the audio component of the conference on the VOIP device and continue the video component of the conference on the client device.

10. The system of claim 9, wherein the server is a private branch exchange (PBX) server.

11. The system of claim 9, wherein the first message is a busy lamp field (BLF) notify message.

12. The system of claim 9, wherein the notification is displayed as one or more soft keys on a user interface of the VOIP device.

13. The system of claim 9, wherein the notification is displayed as a light associated with a hard key on the VOIP device.

14. The system of claim 9, wherein the first message is transmitted using a session initiation protocol (SIP) messaging protocol.

15. The system of claim 9, wherein the second message includes call information.

16. A non-transitory computer-readable medium comprising instructions that when executed by one or more processors, cause the one or more processors to perform operations comprising:
connecting to a conference;
transmitting a first message corresponding to the conference with a client device;
displaying a notification on a display of a voice over internet protocol (VOIP) device responsive to the first message, the notification including one or more configurations associated with an audio component and a video component of the conference, wherein the VOIP device and the client device are wirelessly paired based on a user account;
transmitting a second message to transfer the audio component of the conference to the VOIP device; and
continuing the audio component of the conference on the VOIP device and continuing the video component of the conference on the client device.

17. The non-transitory computer-readable medium of claim 16, wherein the second message includes an action selection based on one or more options to join the conference, wherein the one or more options to join the conference include at least one of an audio option, a video option, or an ignore option.

18. The non-transitory computer-readable medium of claim 17, wherein the audio option allows a user to join the audio component of the conference on the VOIP device and the video component of the conference on a different device.

19. The non-transitory computer-readable medium of claim 17, wherein the video option allows a user to join the audio component and the video component of the conference on a different device.

20. The non-transitory computer-readable medium of claim 17, wherein the ignore option allows a user to ignore the conference.

\* \* \* \* \*